United States Patent [19]

Ghahary

[11] Patent Number: 5,688,602
[45] Date of Patent: Nov. 18, 1997

[54] METHOD FOR PRODUCING LAMINATED ARTICLES

[76] Inventor: Akbar Ghahary, 64 Ricker Dr., Ringwood, N.J. 07456

[21] Appl. No.: 347,278

[22] Filed: Nov. 30, 1994

Related U.S. Application Data

[63] Continuation of Ser. No. 206,810, Mar. 4, 1994, Pat. No. 5,504,126, and a continuation-in-part of Ser. No. 219,335, Mar. 29, 1994, abandoned, said Ser. No. 206,810, is a continuation-in-part of Ser. No. 882,839, May 14, 1992, Pat. No. 5,304,592, and a continuation-in-part of Ser. No. 51,627, Apr. 22, 1993, Pat. No. 5,476,895, and a continuation-in-part of Ser. No. 35,720, Mar. 23, 1993, Pat. No. 5,465,544, said Ser. No. 882,839, said Ser. No. 51,627, and a continuation-in-part of Ser. No. 788,982, Nov. 7, 1991, abandoned.

[51] Int. Cl.$^6$ .................................................. B32B 27/10
[52] U.S. Cl. ........................ 428/481; 428/327; 428/507; 523/171
[58] Field of Search .................................. 524/437, 560, 524/445, 494, 429, 13, 448, 405, 451; 428/481, 507, 321.1, 327, 240, 241; 156/60, 145; 523/121

[56] References Cited

U.S. PATENT DOCUMENTS

| | | | |
|---|---|---|---|
| 4,004,774 | 1/1977 | Houston | 249/114 |
| 4,085,246 | 4/1978 | Buser et al. | 428/220 |
| 5,034,272 | 7/1991 | Lindgren et al. | 156/60 X |
| 5,043,377 | 8/1991 | Nogi et al. | 524/437 |
| 5,314,729 | 5/1994 | Ikezoe et al. | 428/15 |

FOREIGN PATENT DOCUMENTS

| | | | |
|---|---|---|---|
| 0030860 | 3/1981 | Japan | 428/481 |

*Primary Examiner*—Edward J. Cain
*Attorney, Agent, or Firm*—Lieberman & Nowak, LLP

[57] ABSTRACT

The subject invention provides a method for producing a laminated article and the laminated article resulting from such method which comprises contacting a rigid substrate with a plastic material in a liquid or semi-liquid state, said plastic material being held in place by a gasket or spacer and in contact with a flexible film and maintaining contact between the substrate and plastic material under conditions so that the plastic material hardens and adheres to the substrate to form the article. The invention also concerns a plastic edge piece which may be cast and attached to the exposed edges of the laminated article and which has the same appearance as the plastic laminate.

13 Claims, 5 Drawing Sheets

FIG. 5
FIG. 6
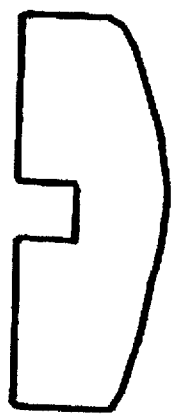
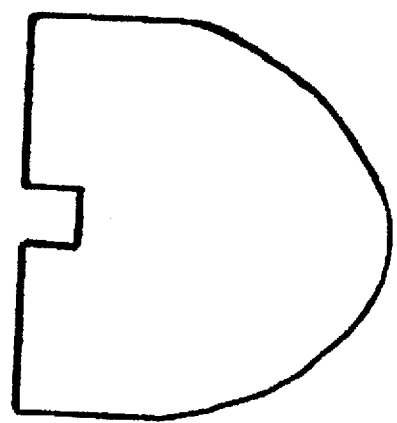
FIG. 7
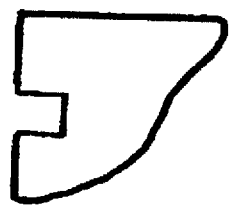

METHOD FOR PRODUCING LAMINATED ARTICLES

This application is a continuation of Ser. No. 08/206,810 filed Mar. 4, 1994, now U.S. Pat. No. 5,504,126; and a continuation-in-part of Ser. No. 08/219,335, filed Mar. 29, 1994, now abandoned. Ser. No. 08/206,810 itself is a continuation-in-part of Ser. No. 07/882,839 filed May 14, 1992, now U.S. Pat. No. 5,304,592; Ser. No. 08/051,627 filed Apr. 22, 1993, now U.S. Pat. No. 5,476,895; and Ser. No. 08/035,720 filed Mar. 23, 1993, now U.S. Pat. No. 5,465,544. Both Ser. Nos. 07/822,839 and 08/51,627 are in turn continuations-in-part of Ser. No. 07/788,982 filed Nov. 7, 1991, now abandoned. The contents of the above referenced applications are hereby incorporated by reference into the present disclosure.

BACKGROUND OF THE INVENTION

The subject invention relates generally to a method of preparing laminated boards, sheets or articles—useful as partitions, shelves, countertops and bathroom vanities—which is more economical and less labor-intensive than existing methods. The present method also enables a consumer to purchase standard size laminated boards, sheets or articles, customize the shape of the laminate for the consumer's individual use, and join the articles to provide a finished look without the need of professional assistance. One aspect of the invention provides a method of manufacture of an article which comprises a substrate and a plastic coating. The plastic coating may be an in situ polymerized thermoplastic or thermoset material laminated to any rigid substrate but preferably a celluosic product such as wood or particle board. Where a mineral-like appearance is desired, the subject invention may utilize the compositions disclosed in my earlier patent applications, which have the appearance of natural stone.

Another aspect of the invention provides a plastic edge piece which is attached to the exposed wood edges of the coated article of the present invention after being cut by the consumer. Generally the plastic edge piece is made of the same plastic material as is laminated to the substrate. The consumer conceals the edge piece and seams between adjacent coated boards by applying additional plastic material in liquid form. After curing, the area of the applied plastic is then sanded for smoothness.

The present invention also provides a method for producing coated substrates and laminates in which the surface smoothness and appearance can be controlled to any desired form. The present invention is particularly useful for the production of laminates comprising a surface layer of a highly filled thermoplastic or thermoset resin having a mineral appearance on a rigid support.

The subject invention also has several economic advantages. First, it uses existing machinery, namely laminating or compression molding machines. Second, the product is manufactured in a way to minimize the labor involved in customizing the articles and sanding. Third, the laminates are made without the use of solvents which can constitute an environmental hazard unless expensive recapturing techniques are used.

BRIEF DESCRIPTION OF DRAWINGS

FIGS. 5, 6 and 7 show edge pieces in cross section finished in various shapes by the customer or pre-finished by the producer prior to attachment to a substrate.

SUMMARY OF THE INVENTION

Figure 1:
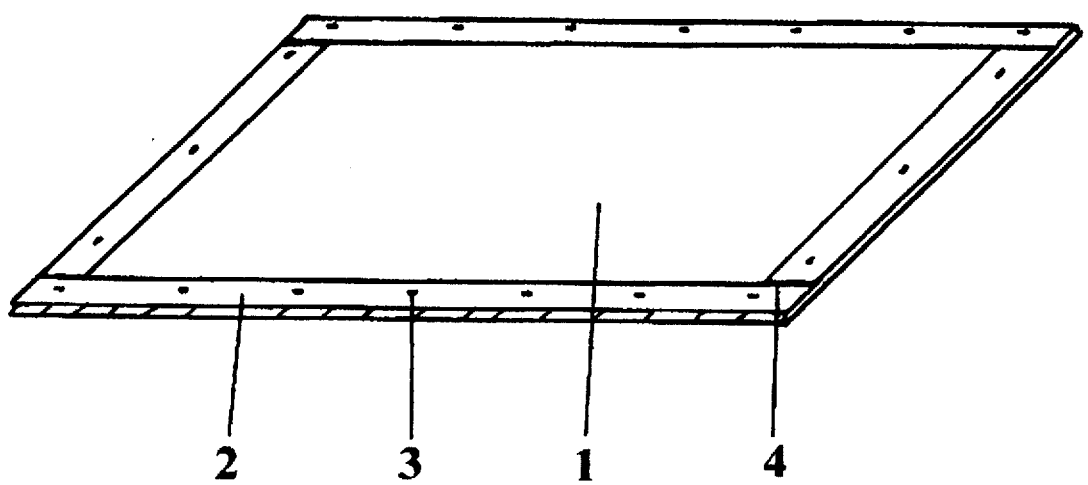
FIG. 1 illustrates the use of a 4'×8'×⅝" particle board as the substrate in the laminate using ½"×0.07" cardboard strips to form the gasket (2) which is preferably stapled (3) to the board. Channels (4) allow excess casting resin to flow from the mold.

The subject invention provides a method for producing a preformed, laminated article having a desired surface appearance which comprises contacting a substrate with a curable plastic material in a liquid or semi-liquid state, said plastic material being held in place by a gasket or spacer and being in contact with a flexible film, maintaining the contact between the substrate, plastic material and the flexible film under conditions such that the plastic material hardens and adheres to the substrate, and recovering a laminated article having the surface appearance of the flexible film. The present invention also relates to laminates having a smooth mineral surface appearance.

The invention further concerns a plastic edge piece which may be cast separately and attached to the exposed edges of the laminated article and which has the same appearance as the plastic laminate.

DETAILED DESCRIPTION OF THE INVENTION

The present invention is based on a compression molding process for the manufacture of a laminated article which comprises forming a layered structure of a thin flexible film, a polymerizable coating resin or similar flowable coating material, retained in the structure by a compressible gasket, and a substrate, the casting resin being present in sufficient quantity to fill the cavity created by the gasket, the substrate and the film, applying pressure to the structure and thereafter curing the casting resin or coating material to obtain a laminate of substrate and cured casting resin or coating material having the surface appearance of the flexible film. If desired and at times necessary to prevent warping of the substrate during the molding process, a second liquid coating resin or coating material is applied to the opposing surface of the substrate again held in place by a gasket. The coating resin can be the same or different material from the one applied to the first substrate. If desired another film is interposed between the liquid coating and the platen of the press.

Once in place in the molding press the liquid casting resin or coating material, gasket and substrate are pressurized and the coating material is polymerized to completion, normally by heating the coating material to activate the further polymerization. The resulting laminate is removed from the press, together with the film which can be retained on the laminate for protection against surface scratches and gouges. Removal of the film provides a coating that duplicates the surface characteristics of the film and in this way one can obtain laminated structures with surfaces that require no further working for the intended use.

The present invention also includes the laminate made by the process of the present invention and particularly laminate having coatings which contain greater than 30% by weight of the coating of a immiscible particulate filler to provide a smooth mineral appearance.

The coating employed in the present invention can be a pre-polymerized liquid thermoplastic or thermoset resins. Suitable pre-polymerized or partially polymerized thermoplastic resins include acrylic resins such as polymethyl methylmethacrylate, and methyl methacrylate copolymers such as are obtained by copolymerization with alkyl acrylates, acrylic acid, methacrylic acid, styrene, and acrylic polyesters. Preferably however the coating or casting resins employed in the present invention are thermosettable polymers such as unsaturated polyesters, epoxy resins, polyurethane resins, crosslinkable acrylic resins and crosslinkable styrene resins. The prepolymerized resins are employed in liquid form, the liquidity resulting inherently from the low molecular weight of the resin or by solution in monomer. Of the thermosettable resins the preferred resins are the unsaturated polyester resins derived from the condensation of an aromatic dicarboxylic acid or anhydride such as isophthalic acid whith one or more diols such as propylene glycol, neopentyl glycol, ethylene glycol, or diethylene glycol in the presense of an unsaturated dicarboxylic acid or anhydride such as maleic anhydride. The prepolymerized unsaturated polyester is then dissolved in a vinyl monomer such as styrene to form the liquid coating composition. Liquid unsaturated polyesters which can be cured by further polymerization to form tough solid coatings are well known in the art, any of which can be used in the present invention as coating materials. The resin, including any filler should have a fluidity at room temperature adequate to fill the cavity created by the gasket, the substrate and the film in the press and also in the event of any excess, flow out of the mold through the channels provided in the gasket. Coating compositions having viscosities in the range of 500 to 40,000 centipoises are suitable in the process of the present invention.

As indicated, the casting resins or coating compositions employed in the present invention are preferably filled resin compositions which give the coating an inorganic mineral surface appearance. Fillers employed in coating compositions to give surfaces having a mineral appearance are well known in the art, having been described in my own patent, U.S. Pat. No. 5,304,592, Nogi et al U.S. Pat. No. 5,043,377, and Buser et al U.S. Pat. Nos. 4,085,246 and 4,159,301, the teachings of which are hereby incorporated by reference. Particularly preferred fillers which give rise to a granite surface are separately prepared thermoplastic or thermoset resin composites containing evenly distributed inorganic particulates. Such composites are then crushed and pulverized to a desired particle size for inclusion in the coating composition. As disclosed in these references, the same type of resin employed as a coating or casting resin can also be employed to form the filler. The preferred fillers employed include particulates of themoset polyesters and/or acrylic resins containing such powdered inorganic materials as talc, silica, gypsum, powdered glass, clay, silicates and particularly aluminas including aluminum trihydrate. The fillers can be employed over a wide concentration range from 2% to 70% by weight of the total coating composition but are preferably employed in the range of 30% to 50% by weight of the total coating composition.

The casting resin or coating composition usually also contains a catalyst which initiates or accelerates the further polymerization such as a peroxide or similar free-radical initiator. Additionally the coating composition may also contain pigments, u-v light stabilizers, antioxidants, coupling agents and mold release agents.

The flexible film employed between the platens of the press and the casting resin or coating composition provides its surface characteristic to the resulting laminate. Generally speaking it is desired to produce a laminate having a smooth surface that does not require further finishing. Such finish is accomplished by having a thin flexible plastic film which does not adhere to the laminate or only adheres slightly so that it can be easily removed from the laminate but still adheres sufficiently to serve as a protective layer prior to use of the laminate. Plastic films useful in the process of the present invention include polyolefin films, polyvinylidene chloride films and preferably polyester films commercially available under the tradename "Mylar."

The gasket material can be any solid material including metal, plastic or wood. Preferably, however, the gasket material can be controllably compressed to a desired thickness by the application of pressure used in the molding process. Materials that exhibit a 10% or greater reduction in the molding process have been found to be suitable. One particularly preferred material is cardboard since it can be readily cut to provide the gasket and also can be compressed to the desired thickness considering the limits of its compressability. It also withstands any temperature encountered in the molding process. Hard rubber, elastomeric polyolefins and flexible polyurethane foams are also useful as gasketing material as are many composites made from resins and cellulosic fibers.

Figure 3:
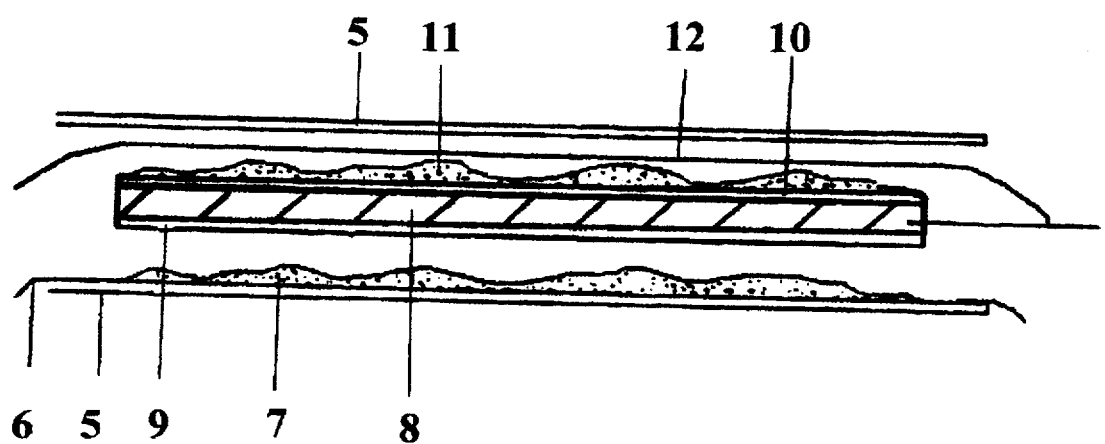
FIG. 3 illustrates the process of the present invention in which the casting resin is applied to both major surfaces of a substrate. Thus in an addition to the film (6), resin (7) and gasket (9) attached to the substrate (8) a second gasket (10) is attached to the opposing major surface of the substrate (8) to contain the second application of resin (11) on top of which is stretched the plastic film (12) in contact with the platen or shim (5) of the molding press.

The substrate to which the coating is applied can be any semi-rigid or rigid material having a surface providing adhesion to the coating or casting resin composition. In general the process of the present invention is used with cellulosic type of material, such as solid wood boards, plywood, balsa sheets, particle boards and related composites containing cellulosic fibers. Other substrates or cores for the laminates of the present invention include high density polyurethane foam, honeycomb structures of reinforced cardboard, fiberglass or carbon fiber reinforced sheets and similar structures. Where the substrate is not rigid enough to support the coating as produced in the present invention without warping, it may be desirable to apply a similar or different second coating on the opposing surface of the substrate which can be applied in the same way as the first coating such as illustrated in FIG. 3.

The size of sheets employed is only limited by the size of the molding equipment employed and includes, in addition to the 4'×8' already described sheets, dimensions from less than 1' to 12' or more.

The process of the present invention can be conducted in any of the commercially available compression molding presses and preferably in one that provides for heating of the platens to raise the temperature of the coating layer to allow for rapid curing. Generally speaking, it is desired to heat the coating composition to a temperature within the range of 70° to 300° F. The pressures employed may vary, but generally speaking it is not necessary to use pressures in excess of 100 psi. The process is continued for a time adequate to polymerize substantially all of the polymerizable ingredients in the coating or casting resin.

In place of using a second coating on the opposing major surface, the rigidity of a substrate or core can also be enhanced during the molding process by laminating the opposing surface of the substrate to an additional sheet comprising a compposite of a partially cured resin and a fibrous material in which resin cures and adheres to the substrate during the molding process.

Figure 4:
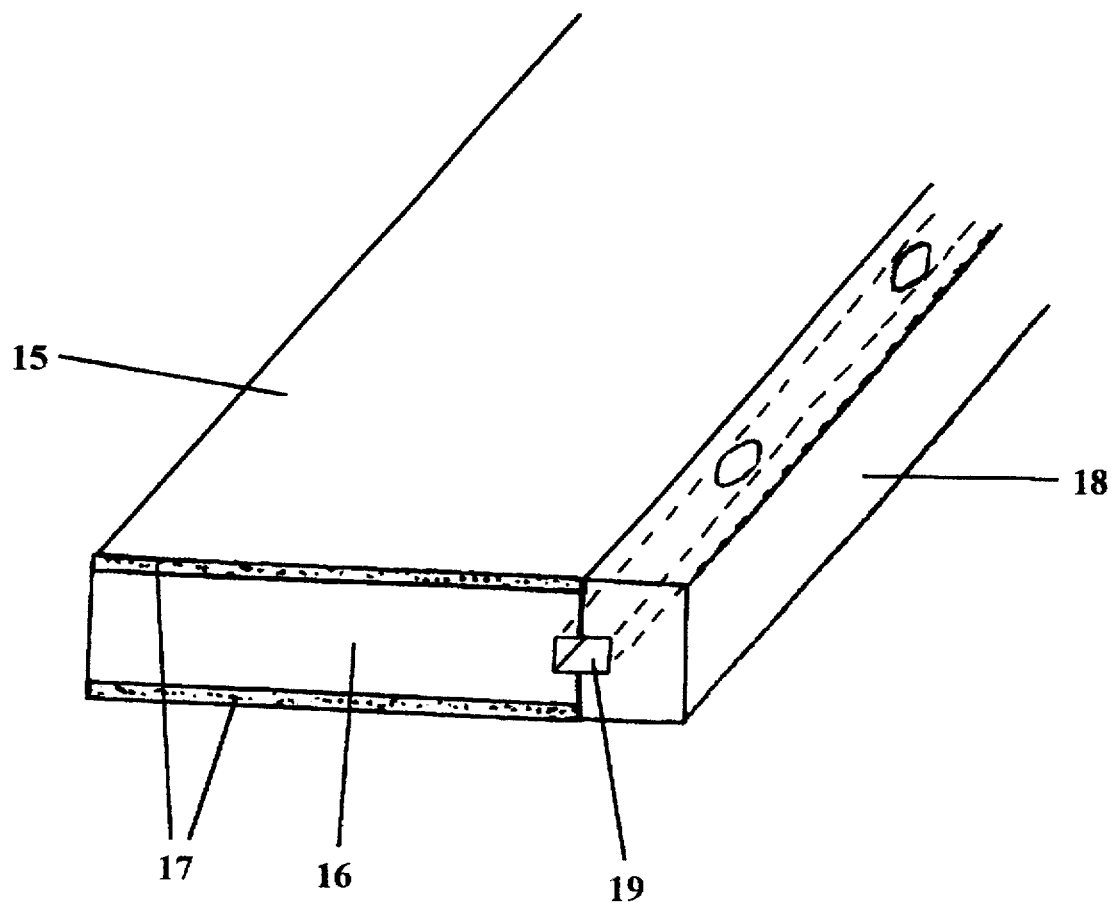
FIG. 4 illustrates a laminate (1) comprising a board (16) with surface coatings on opposite sides (17) to which is attached an edge piece (18) pre-cast from the same composition as the coating, by means of dowels (19).

In some instances, particularly where the laminates of the present invention are intended to be used as countertops, it may be desirable to provide an edge coating for the laminate. Such edges can be provided in several ways such as by spraying, brushing or otherwise coating the edge of the board with the same composition as was used in forming the laminate or there may be used a pre-cast edge or nose strip which is attached to the edge of the laminate by means of dowels or similar devices as illustrated in FIG. 4. If desired, any visible seam between the laminate and the edge or nose strip can be additionally coated so that the seam is hidden. In order to maintain uniformity of appearance and properties the edge piece should be cast from the same composition that is employed for the surface layer of the laminate.

The present invention is further illustrated, but not in any way limited, by the following specific embodiment of the invention.

Over the top of heatable platen of a commercial molding press large enough to accomodate a 4'×8' sheet is stretched a two mil commercially available polyester film. Using a doctor blade, a flowable casting resin having a viscosity of 20,000 centipoises at room temperature (as measured on a R.V.F. 100 Brookfield Viscosimeter using a springdale #6 spindle at 100 rpm) is evenly spread to a thickness of slightly more than 1/16". The particular flowable casting resin was a commercially available unsaturated polyester compostion sold as "Granicoat". The unsaturated polyester contained a polymerized resin filler designed to give the coating composition a granite appearance. Preparation of such filler is described in my copending application Ser. No. 08/051,627 filed Apr. 22, 1993 which is hereby incorporated by reference.

Figure 2:
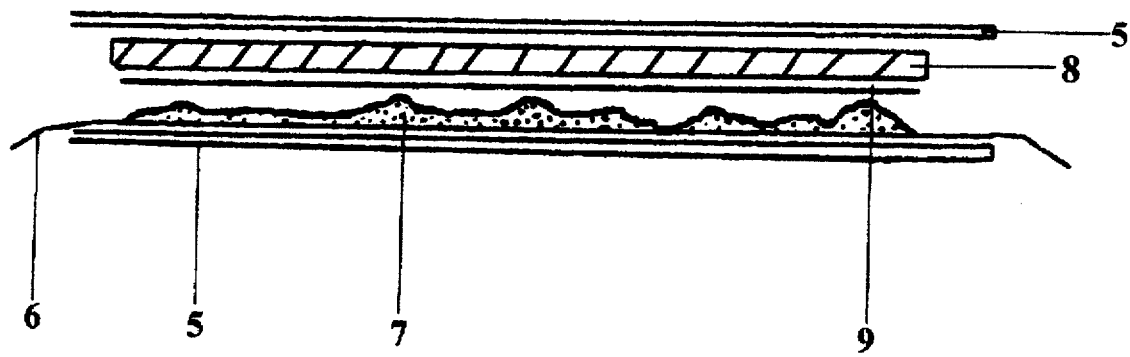
FIG. 2 illustrates the molding process of this invention in which a thin plastic film (6) is stretched over a shim or platen (5) of a molding press. The flowable casting or coating resin (7) is placed on top of the film (6) and if desired can be smoothed using a doctor blade. The substrate (8) with the gasket (9) attached is lowered on the spread resin (7) and the assembly is compressed between the platens (5). The assembly is then heated to cure the resin and adhere the resin to the substrate.

To a 4'×8'×5/8" particle board are stapled along the edges of the board ½" wide 0.07" thick cardboard strips forming a gasket to contain the casting resin as illustrated in FIG. 1. Channels are provided at the corners of the gasket to allow excess casting resin to flow from the mold. The gasketed surface of the board is placed in contact with the spread resin as illustrated in FIG. 2. The assembly is subjected to a pressure of approximately 100 psi and the platen in contact with the resin is heated to a temperature of 200° F. which is maintained for a period of 5 minutes thereby fully curing and adhering the coating to the board.

The resulting laminate contains a 1/16" layer of smooth surfaced granite like material firmly attached to the particle board with the polyester film adhered to the surface of the coating. The film can be mechanically removed at any time and preferably is retained to serve as protection for the surface until final use of the board.

The uncoated edges of the particle board can be sawn off or spray coated or brushed with the casting resin to provide a finished article. Preferably the uncoated edge portions are sawn off and replaced with a doweled edge piece (illustrated in FIG. 4) cast from the same composite as is used for the surface of the laminate.

What is claimed is:

1. A method for producing a laminated article which comprises forming a laminate comprising a rigid substrate, a polymerizable flowable thermosetting resin composition, said resin containing an immiscible solid filler and being held in place by a gasket and a flexible thin film, placing said laminate in a molding press under sufficient pressure to obtain the desired resin layer thickness, maintaining the said laminate in said press under polymerization conditions until essentially completely polymerized and recovering a laminated article comprising a rigid substrate, a thermoset resin composition and a flexible thin film.

2. The method of claim 1 wherein the polymerizable flowable thermosetting resin composition is a filled unsaturated polyester resin.

3. The method of claim 1 wherein the substrate comprises a wood product.

4. The method of claim 2 wherein the polyester resin contains from 30% to 70% by weight of the total composition of a filler resulting in a surface having a mineral appearance.

5. The method of claim 1 wherein the thin flexible film is a polyester film.

6. The method of claim 1 wherein a flowable thermosetting polymerizable resin gasket and flexible film is applied to two opposing surfaces of the rigid substrate.

7. The method of claim 3 wherein the wood product is a particle board.

8. The method of claim 1 wherein the gasket is compressible at the molding pressures.

9. A laminate comprising a particle board having at least one of its major surfaces coated with a filled thermoset plastic composition containing a filler to provide a mineral appearance to the surface of the coating and a protective film for that coating said laminate having been molded to said board.

10. The laminate of claim 9 wherein the plastic composition is obtained by the further polymerization of an unsaturated polyester resin.

11. The laminate of claim 9 wherein at least one edge of the board is attached to a precast edge piece of the same filled plastic composition.

12. The laminate of claim 10 wherein the protective film is a polyester film.

13. A method of preparing countertop articles which comprises forming a laminate comprising a rigid cellulosic fiber board at least one major surface of which being in contact with a liquid unsaturated polymerizable polyester resin, said resin containing from 30% to 70% by weight of the total composition of a thermoset resin filler providing a mineral appearance, said resin being held in place by a cardboard gasket and a flexible film placing said laminate in a molding press under sufficient pressure to cause the resin to fill the cavity created by the gasket and obtain the desired resin layer thickness, heating the resin layer to a temperature of 70° to 300° F., and recovering a laminate of said fiber board, fully polymerized, thermoset polyester coating and flexible film.

* * * * *